United States Patent [19]
Zinno

[11] Patent Number: 5,668,869
[45] Date of Patent: Sep. 16, 1997

[54] MOBILE TELEPHONE HANDSET HOLDER

[76] Inventor: Raphael Zinno, 31 Edith Drive, Toronto, Ontario, Canada, M4R 1Y9

[21] Appl. No.: 601,607

[22] Filed: Feb. 14, 1996

[51] Int. Cl.$^6$ .................................................. H04M 1/00
[52] U.S. Cl. ........................ 379/449; 379/446; 379/454; 379/455
[58] Field of Search ........................... 379/449, 447, 379/454, 455, 426, 428

[56] References Cited

U.S. PATENT DOCUMENTS

| | | | |
|---|---|---|---|
| D. 308,062 | 5/1990 | Leoni et al. | D14/253 |
| D. 315,353 | 3/1991 | Greenwood et al. | D14/253 |
| 2,552,906 | 5/1951 | Paul | 379/449 |
| 4,771,927 | 9/1988 | Ventura | 224/252 |
| 4,961,223 | 10/1990 | Sutton | 379/449 |
| 5,008,932 | 4/1991 | Sleggen | 379/449 |
| 5,503,313 | 4/1996 | Wei | 379/449 |
| 5,542,589 | 8/1996 | McKee | 379/428 |

*Primary Examiner*—Jack K. Chiang

[57] ABSTRACT

The present invention provides a telephone handset holder which engages a mobile telephone handset and is provided with means for clipping the holder to the shoulder strap of a seat belt, preferably so that the handset is oriented toward the user's ear when in position for use. In the preferred embodiment the holder is slidably mounted to the shoulder strap, fixed in position by frictional engagement, and can be slid to the most comfortable position for use. When the telephone is not in use the handset can be slid down the shoulder strap to lap level for temporary storage, without removing the handset from the holder and without detaching the holder from the shoulder strap.

20 Claims, 3 Drawing Sheets

MOBILE TELEPHONE HANDSET HOLDER

FIELD OF INVENTION

This invention relates to telephone handset holders. In particular, this invention relates to a holder for supporting a mobile telephone handset in position for use while driving.

BACKGROUND OF THE INVENTION

Mobile telephones, commonly known as "cellular telephones", have become extremely popular in the past decade. One of the most common uses for mobile telephones is in an automobile, where mobility precludes the use of a hard-wired communications system. The widespread availability and relatively low cost of mobile telephones has all but eliminated the more traditional CB radio as the communications device of choice for automobiles.

One of the disadvantages that this gives rise to, however, is that the user must dedicate one hand to the use of the telephone, which during the operation of an automobile is inconvenient at best, and is often dangerous. So-called "hands free" systems are available to avoid this problem, but these primarily involve speaker and/or microphone extensions which are connected to the telephone and must be mounted within the automobile cabin, the speaker in a position from which it can be heard and the microphone in a position in which it will pick up the driver's voice. As such the microphone will pick up any ambient noise from within the automobile cabin, and the user's privacy is lost if there are other occupants in the automobile. Such systems are also quite expensive, particularly considering that they are merely redundant extensions of features that are already built into the telephone handset.

Holders for telephone handsets generally are known. For example, U.S. Pat. No. 5,008,932 for an Adjustable Phone Handset Shoulder Support and U.S. Pat. No. 4,552,995 for a Portable Cordless Phone Holder both teach handset holders which are adapted to rest on the user's shoulder and support the telephone handset in position for use, ie. adjacent to the user's ear and mouth. However, such holders are relatively cumbersome and bulky, and the use of a shoulder support for supporting the handset can cause muscle strain and fatigue as the user will have a tendency to raise the shoulder or bend the neck to properly position the handset. This to some degree also restricts movement of the user's arm, which is not particularly desirable when the user is driving an automobile. Moreover, in each case the holder is fixed in position on the user's shoulder when in use, and must be completely removed when not in use so as not to unnecessarily obstruct the user's movement or vision while driving.

SUMMARY OF THE INVENTION

The present invention overcomes these disadvantages by providing a telephone handset holder which engages the handset and is provided with means for clipping the holder to the shoulder strap of a seat belt. The handset is thus supported by the shoulder strap, not the user, so that the handset is oriented toward the user's ear and mouth when positioned for use.

In the preferred embodiment the holder is slidably mounted on the shoulder strap, fixed in position by frictional resistance to movement, and can be slid along the shoulder strap to the most comfortable position for use. Moreover, when the handset is not in use, the holder can be slid down the shoulder strap toward lap level for temporary storage, well out of the way of the user's head, without removing the handset from the holder and without detaching the holder from the shoulder strap.

It will be appreciated that the use of the holder of the present invention can increase automobile safety, by freeing the driver's hands during use of a mobile telephone, providing an easy means for stowing the telephone well out of the way when not in use, and even by encouraging the use of the safety belt in an automobile.

The present invention thus provides a holder for a mobile telephone handset comprising handset gripping means for gripping the handset and strap clipping means attached to the handset gripping means for slidably engaging the holder to a shoulder strap of a seat belt in an automobile, whereby the strap clipping means frictionally engages the shoulder strap to retain the holder in a selected position along the shoulder strap.

The present invention further provides a holder for a mobile telephone handset comprising handset gripping means for gripping the handset comprising a pair of opposed resilient gripping arms, strap clipping means for slidably engaging the holder to a shoulder strap of a seat belt in an automobile, comprising at least one clip arm projecting from a clip base attached to the handset gripping means, for frictionally engaging the shoulder strap to retain the holder in a selected position along the shoulder strap, whereby the frictional engagement of the holder to the shoulder strap may be overcome by a user to slide the holder to a selected position along the shoulder strap.

BRIEF DESCRIPTION OF THE DRAWINGS

In drawings which illustrate by way of example only a preferred embodiment of the invention.

DETAILED DESCRIPTION OF THE INVENTION

Figure 1:
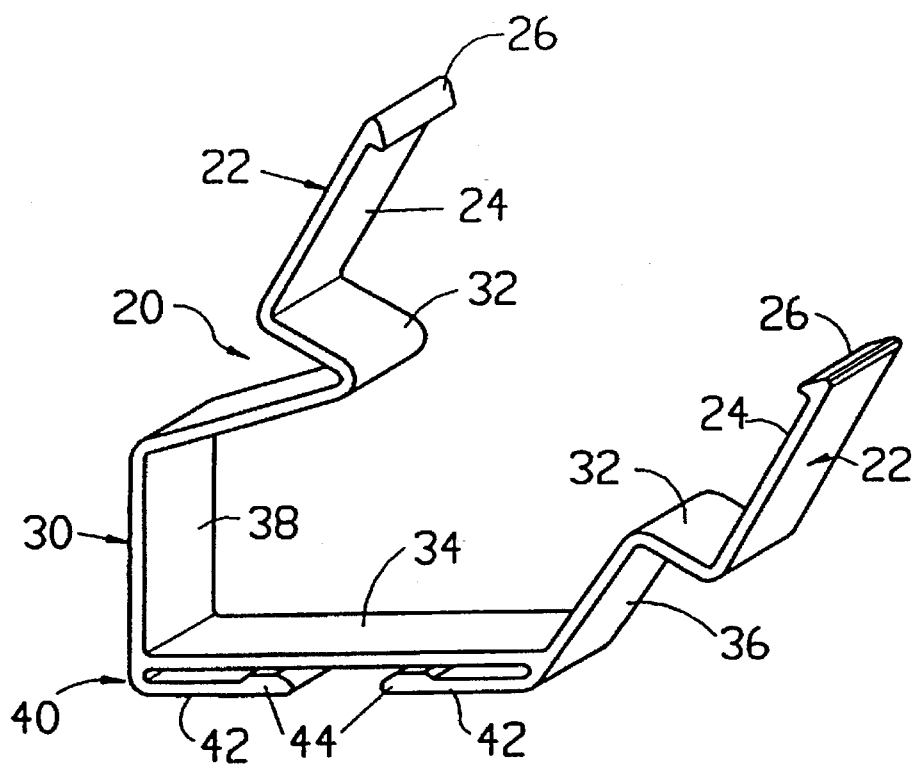
FIG. 1 is a perspective view of a preferred embodiment of the telephone handset holder.

FIG. 1 illustrates a preferred embodiment of the telephone handset holder 20 of the invention for mounting a mobile telephone handset 10 to the shoulder strap 4 of an automobile. A typical mobile telephone handset 10 has a generally rectangular housing including side walls 12 which may or may not be provided with a recess 14, a rear wall 16, and a front panel 18 which provides a push button dialling pad and appropriate openings to the microphone and speaker (not shown).

The holder 20 is provided with handset gripping means 22, which in the preferred embodiment comprises a pair of opposed resilient gripping arms 24 spaced apart so as to snugly grip the handset 10. The gripping arms 24 project in generally parallel relation from a base portion 30, and each gripping arm 24 terminates in a barb 26 for resisting dislodgement of the handset 10.

Figure 2:
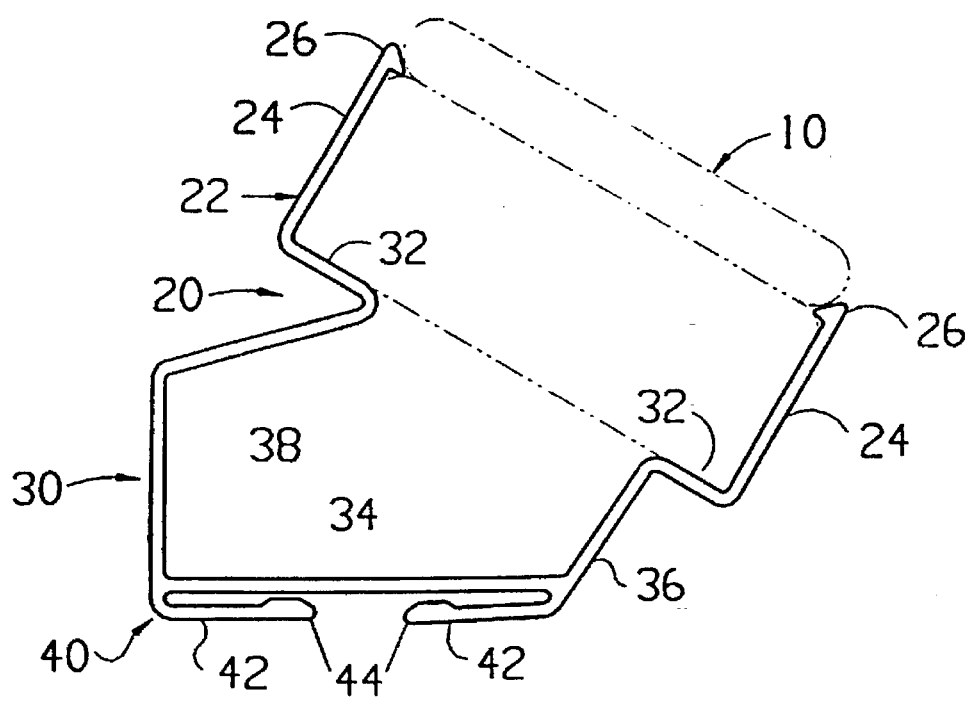
FIG. 2 is an end elevation of the telephone handset holder of FIG. 1 showing the handset in phantom lines.

The base portion 30 includes a pair of back support surfaces 32 oriented generally orthogonally to the gripping arms 24, which surfaces 32 abut the back 16 of the handset 10 when the handset 10 is fully engaged in the gripping means 22. Thus, the length of each gripping arm 24 is preferably selected so that the barbs 26 lodge into recesses 14 extending longitudinally along the sides 12 of the handset 10, or in the absence of recesses 14, so that the barbs 26 just clear the sides 12 of the handset 10, when the handset 10 is fully engaged in the gripping means 22. Thus, when the handset 10 is engaged in the gripping means 22 as shown in FIG. 2, the barbs 26 retain the handset 10 against the back support surfaces 32.

The base portion 30 includes strap clipping means 40 comprising in the preferred embodiment a clip base 34 oriented at an acute angle relative to the back support surfaces 32. In the embodiment shown the clip base 34 is oriented at approximately 45° relative to the back support surfaces 32, for reasons which will be described below. The clip base 34 is wide enough to accommodate the width of a standard seat belt shoulder strap 4, and in the embodiment shown is attached to the back support surfaces by connecting members 36, 38.

Figure 3:
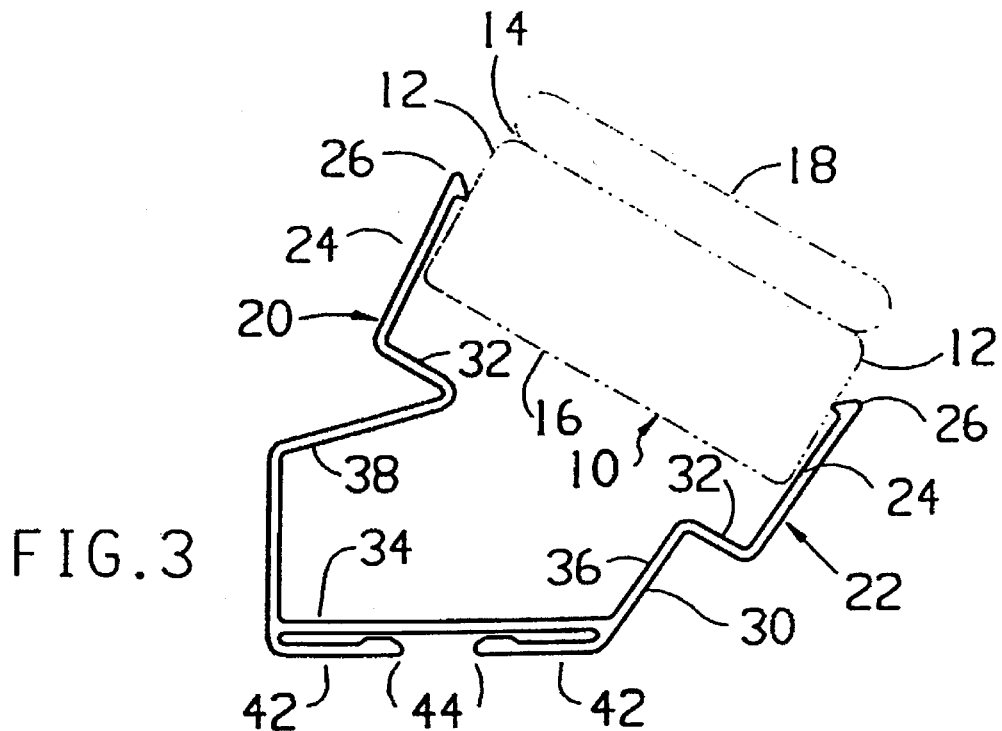
FIG. 3 is an end elevation of the telephone handset holder of FIG. 1 showing the handset being inserted into the holder.

Preferably the holder 20 is extruded, moulded or otherwise formed from a semi-rigid plastic such as PVC or ABS, all components of the holder 20 being thereby integrally connected for strength. Appropriate strengthening ribs and reinforcing braces (not shown) may be formed into the holder 20 as required, which may or may not be necessary depending upon the type of plastic used, the thickness of the plastic and the depth (end to end) of the holder 20. The selected plastic should be strong enough that the gripping arms 24 provide a good grip on the handset 10, but resilient enough so that the gripping arms 24 are able to splay apart slightly to accommodate the handset 10 as it is being inserted into or removed from the holder 20, as illustrated in FIG. 3.

It will be appreciated that the degree of flexure in the gripping arms 24 is increased by the open configuration of the base portion 30, in that the back support surfaces 32 are not directly connected together and can thus spread apart when the gripping arms 24 are urged outwardly. If desired the back support surfaces 32 could be connected together, either by a web of plastic or by integrating the support surfaces 32 into a single back support surface, to increase the rigidity of the gripping arms 24.

In the preferred embodiment the strap clipping means 40 comprises a pair of opposed clip arms 42 which are formed integrally with the holder 20 and project from the clip base 34. The clip arms 42 are each oriented generally parallel to the clip base 34 and are closely spaced therefrom. The clip arms 42 may be provided with enlarged portions 44 which abut or rest very close to the clip base 34 so that, when the clip arms 42 are engaged to a shoulder strap 4, the shoulder strap 4 is squeezed between the enlarged portions 44 and the clip base 34, to provide the necessary frictional resistance to movement.

Thus, the clip arms 42 prevent lateral dislodgement of the holder 20 from the shoulder strap 4, but also provide a transverse frictional engagement against the shoulder strap 4 to retain the holder 20 on the shoulder strap 4 at a level selected by the user. The selected plastic should be such that the clip arms 42 provide a strong grip against the shoulder strap 4, but are resilient enough so that the clip arms 42 are able to flex away from the clip base 34 slightly, to accommodate the shoulder strap 4 as it is being inserted into the clipping means 40 in the manner illustrated in FIG. 4.

It can thus be seen that the frictional force of the clip arms 42 and clip base 34 against the shoulder strap 4 must be sufficient to resist the gravitational force of the handset 10, and any additional downward momentum caused by the motion of the automobile and, at the same time, the frictional resistance to movement of the holder 20 along the shoulder strap 4 should be capable of being overcome fairly easily by the user. Since mobile telephone handsets are typically fairly light, there is a wide range of frictional resistance which will accomplish this and, as such, there are several conventional configurations of clipping means 40 which could be used in place of the opposed clip arms 42 described and illustrated. However, the opposed clip arms 42 are preferred since their opposed orientation prevents lateral dislodgement of the holder 20 from the shoulder strap 4 (which is important in a moving automobile), and the relatively short length of each clip arm 42 will impart significant rigidity that will urge the clip arms 42 against the shoulder strap 4 and frictionally maintain the holder 20 in the selected position along the shoulder strap 4. If necessary, those surfaces of the clip base 34 and/or the clip arms which bear against the shoulder strap 4 can by knurled or mottled or otherwise provided with a rough texture to increase the frictional resistance to movement of the holder 20 along the shoulder strap 4.

Figure 4:
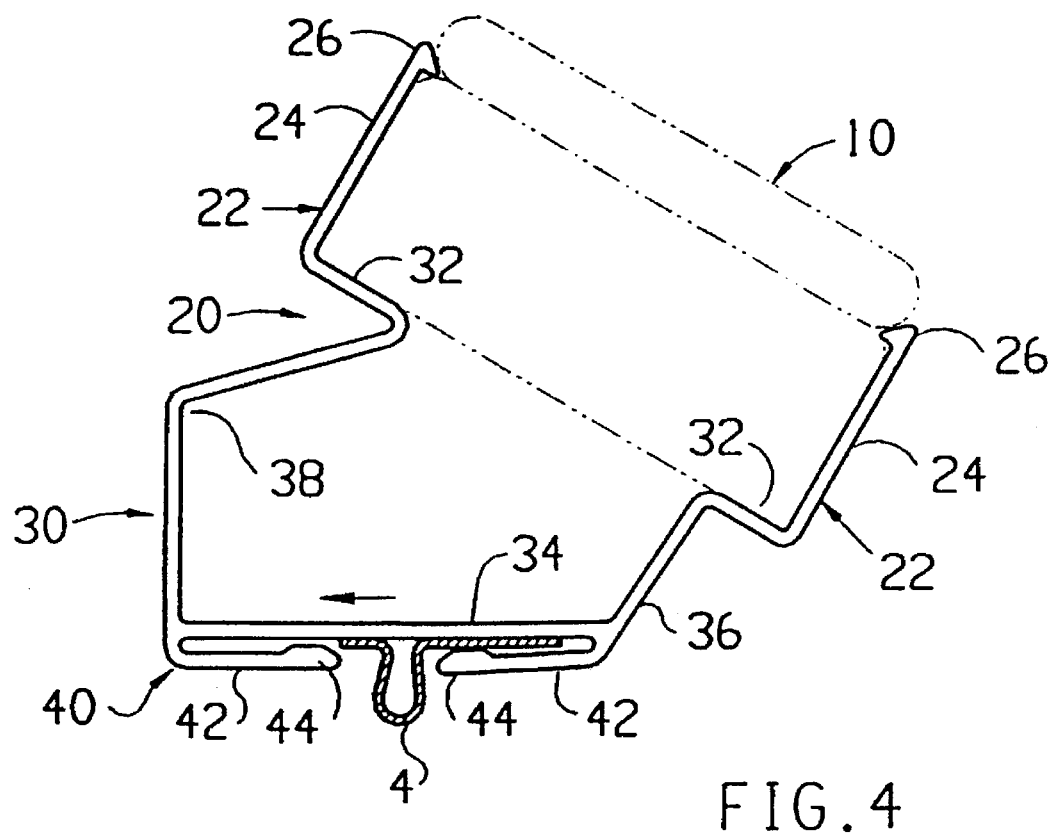
FIG. 4 is an end elevation of the telephone handset holder of FIG. 1 showing the manner of insertion of the shoulder strap into the strap clip.

In operation, the shoulder strap 4 is inserted into the clipping means in the manner illustrated in FIG. 4, by sliding one edge of the shoulder strap 4 fully between one clip arm 42 and the clip base 34, pinching the sides of the shoulder strap 4 together so that the strap 4 puckers longitudinally, and inserting the other edge of the shoulder strap 4 between the other clip arm 42 and the clip base 34. The strap clipping means 40 should be wide enough that the shoulder strap 4 lays flat against the clip base 34 when fully inserted. The handset 10 is inserted into the handset gripping means 20 in the manner shown in FIG. 3, such that the gripping arms 24 snap into snug engagement against the sides 12 of the handset 10 as the barbs 24 engage the recess 14 or clear the sides 12 of the handset 10.

Figure 5:
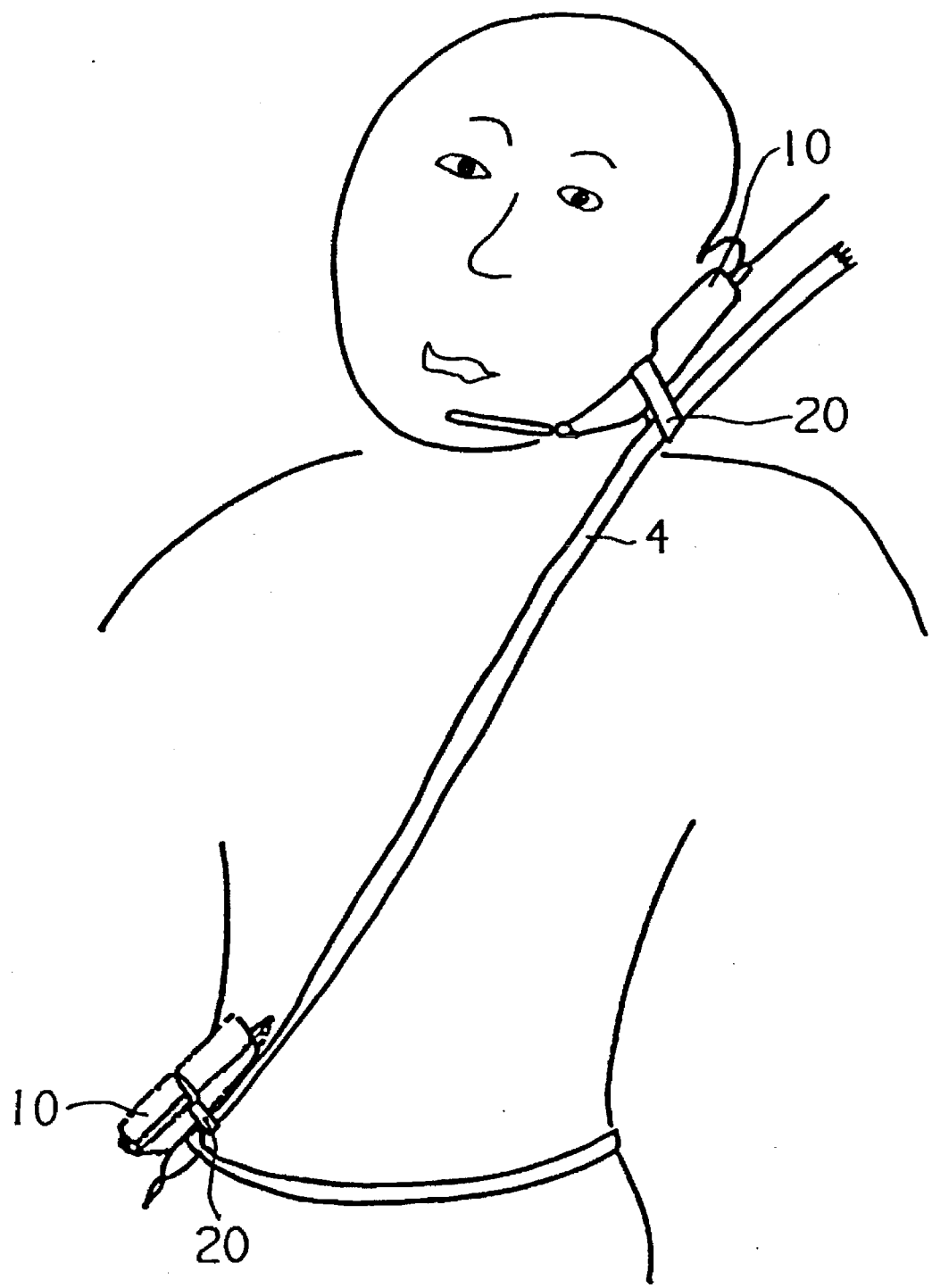
FIG. 5 is an end elevation showing the telephone handset holder attached to a shoulder strap in an automobile.

FIG. 5 illustrates the mobile telephone handset holder of the invention in operation, with the holder 20 positioned at the level of the user's head when the handset 10 is in use. It can be seen that the shoulder strap 4 when worn by the user faces generally forwardly and slightly upwardly; thus the handset gripping means 22 is oriented at an acute angle relative to the clip base 34 so that the handset 10 generally faces the user's head. Minor adjustments in the level of the handset 10 can be made by sliding the holder 20 slightly up or down along the shoulder strap 4. When the handset 10 is not in use, the user simply grasps the handset 10 or the holder 20 and slides the holder 20 down the shoulder strap 4 toward lap level, as shown in phantom in FIG. 5, where the handset 10 is essentially stowed. The user can at any time slide the handset 10 and holder 20 back up along the shoulder strap 4 to head level for further use.

In most cases it is not strictly necessary that the clips 42 bear very strongly against the clip base 34, as the pressure of the shoulder strap 4 against the user's body will generally be sufficient to maintain the holder 20 in position.

When the user leaves the automobile, the handset 10 may be easily disengaged from the holder 20 and taken by the user while leaving the holder 20 clipped to the shoulder strap 4. Alternatively, the entire holder 20 can be easily removed from the shoulder strap 4 for use in another automobile.

Preferred embodiments of the invention having thus been described by way of example, it will be apparent to those skilled in the art that modifications and adaptations may be made without departing from the scope of the invention. For example, there are many other conventional means available for securing the handset 10 to the holder 20, and as noted above there are several conventional configurations of clipping means 40 which could be used in place of the opposed clip arms 42 described and illustrated. The invention is intended to include all such embodiments as fall within the scope of the appended claims.

I claim:

1. A holder for a mobile telephone handset comprising handset gripping means for gripping the handset, and strap clipping means including a resilient clip arm spaced from a clip base attached to the handset gripping means, for slidably engaging the holder to a shoulder strap of a seat belt in an automobile, whereby the strap clipping means frictionally engages the shoulder strap to retain the holder supported by the shoulder strap at a selected position along the shoulder strap, such that the frictional engagement can be overcome by a user to slide the holder along the shoulder strap to thereby support the holder at .a different position, such that the handset is supported near a level of the user's shoulder during a telephone conversation.

2. The holder of claim 1 in which the strap clipping means comprises at least one clip arm, whereby when the handset is mounted to the holder and the holder is clipped to the shoulder strap the holder may be positioned at a level near the user's head when in use and is frictionally engaged in said head position by the clip arm.

3. The holder of claim 2 in which the frictional engagement of the holder to the shoulder strap may be overcome by the user to slide the holder to different position on the shoulder strap when the handset is not in use.

4. The holder of claim 2 in which the handset gripping means comprises a pair of opposed resilient gripping arms.

5. The holder of claim 4 in which the gripping arms terminate in a barb for retaining the handset in the handset gripping means.

6. The holder of claim 4 in which the handset gripping means is oriented relative to the strap clipping means such that when the holder is clipped to the shoulder strap at head level the handset is directed toward the user's head.

7. The holder of claim 2 in which the handset gripping means comprises a back support surface which abuts a back of the handset when engaged in the handset gripping means.

8. The holder of claim 2 in which the handset gripping means comprises a pair of back support surfaces maintained in spaced apart relation by a clip base.

9. The holder of claim 2 in which the strap clipping means comprises a pair of opposed resilient clip arms.

10. The holder of claim 9 in which one or both of the clip arms are provided with an enlarged portion for increasing the frictional engagement of the clip arms against the shoulder strap.

11. The holder of claim 2 in which all components of the holder are integrally formed from plastic.

12. A holder for a mobile telephone handset comprising handset gripping means for gripping the handset comprising a pair of opposed resilient gripping arms, and strap clipping means for slidably engaging the holder to a shoulder strap of a seat belt in an automobile, comprising at least one resilient clip arm spaced from a clip base attached to the handset gripping means, for frictionally engaging the shoulder strap to retain the holder in a selected position along the shoulder strap supported by the shoulder strap, whereby the frictional engagement of the holder to the shoulder strap may be overcome by a user to slide the holder to be supported by the shoulder strap at selected positions along the shoulder strap, such that the handset is supported near a level of the user's shoulder during a telephone conversation.

13. The holder of claim 12 in which the gripping arms terminate in a barb for retaining the handset in the handset gripping means.

14. The holder of claim 12 in which the handset gripping means is oriented relative to the strap clipping means such that when the holder is clipped to the shoulder strap at head level the handset is directed toward the user's head.

15. The holder of claim 12 in which the handset gripping means comprises a back support surface which abuts a back of the handset when engaged in the handset gripping means.

16. The holder of claim 12 in which the handset gripping means is attached to the clip base to which the strap clipping means is attached.

17. The holder of claim 16 in which the handset gripping means is oriented at an angle relative to the clip base.

18. The holder of claim 12 in which the handset gripping means comprises a pair of back support surfaces maintained in spaced apart relation by the clip base.

19. The holder of claim 12 in which the strap clipping means comprises a pair of opposed resilient clip arms and one or both of the clip arms are provided with an enlarged portion for increasing the frictional engagement of the clip arms against the shoulder strap.

20. The holder of claim 12 in which all components of the holder are integrally formed from plastic.

* * * * *